(No Model.) 2 Sheets—Sheet 1.
H. ZIMMERMAN.
SHUTTER BOWER.
No. 520,471. Patented May 29, 1894.
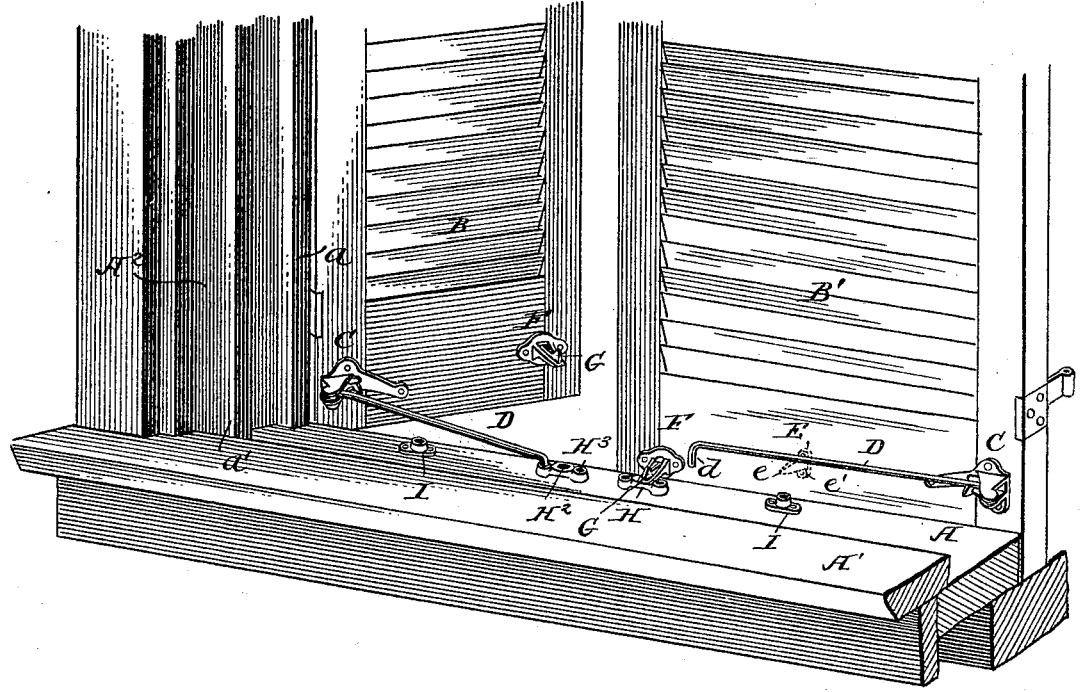
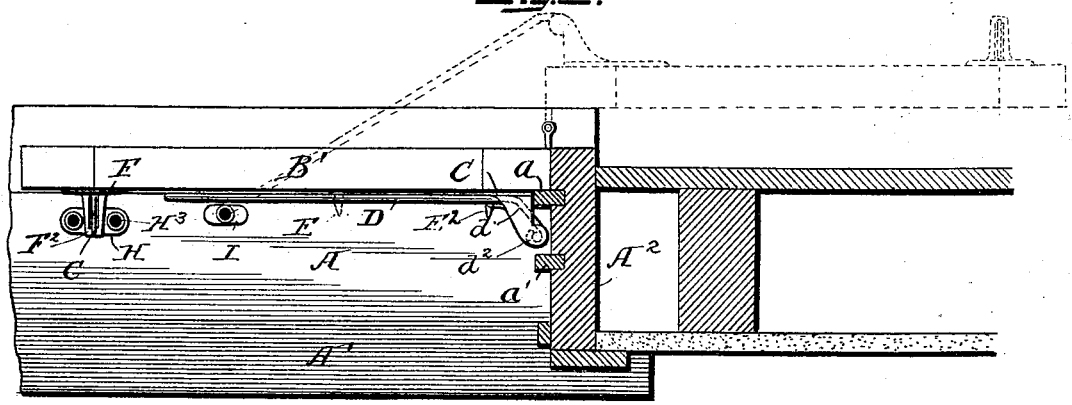

(No Model.) 2 Sheets—Sheet 2.
H. ZIMMERMAN.
SHUTTER BOWER.
No. 520,471. Patented May 29, 1894.
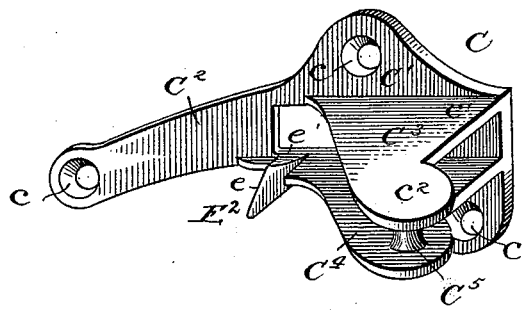
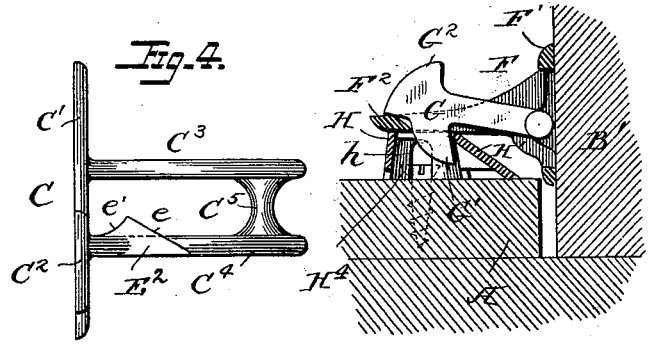
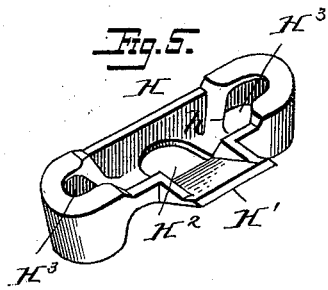
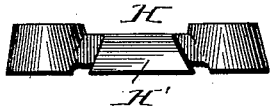
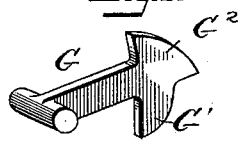
Witnesses
Jno. G. Hinkel
A. N. Dobson
Inventor
Harry Zimmerman
By Foster Freeman
Attorneys

UNITED STATES PATENT OFFICE.

HARRY ZIMMERMAN, OF FREDERICK, MARYLAND.

SHUTTER-BOWER.

SPECIFICATION forming part of Letters Patent No. 520,471, dated May 29, 1894.

Application filed July 21, 1893. Serial No. 481,124. (No model.)

*To all whom it may concern:*

Be it known that I, HARRY ZIMMERMAN, a citizen of the United States, residing at Frederick, in the county of Frederick and State of Maryland, have invented certain new and useful Improvements in Shutter-Bowers, of which the following is a specification.

My invention relates to shutter bowers, and it has for its object to improve the details of construction and arrangement, as well as the mode of operation of such devices, and to these ends my invention consists in the various features hereinafter more particularly set forth.

Referring to the accompanying drawings, Figure 1, is a perspective view of the lower portion of a window, showing my improvement attached. Fig. 2, is a horizontal section of a portion of the same. Fig. 3, is a perspective view of my improved bracket. Fig. 4, is an end view of the same. Fig. 5, is an inverted, perspective view of the bowing and locking sill-plate. Fig. 6, is a transverse, sectional view showing the said bowing and locking sill-plate, and the locking catch. Fig. 7, is a front view of the sill-plate; and Fig. 8, is a perspective view of the locking catch.

My invention relates to that general class of shutter bowers which is shown and described in Letters Patent No. 420,180, dated January 28, 1890, and the object of my invention is to provide a shutter bower which shall be simple and cheap of construction, effective in operation, and not liable to get out of order, and which shall avoid some of the objections inherent to shutter bowers of this class as heretofore made, and I will now proceed to describe the details of construction of various parts, and how they operate, referring to the accompanying drawings, in which I have illustrated the preferred embodiment of my invention, it being understood that I do not limit myself to the precise details of construction or arrangement, and that the parts of my improvement may be used together, or separately, or in connection with other well-known or equivalent parts, depending upon the exigencies of any particular case.

It is not deemed necessary to fully describe the window and shutter arrangement, it being sufficient to say that A represents the sill, A' the stool, A² the frame or casing of an ordinary window, and B, B', represent the two complementary parts of an ordinary shutter.

It will be understood that my invention provides means whereby a shutter can not only be locked in a closed position, but that it can be opened or bowed, and held in various positions or angles, and that it can be completely opened and securely locked in an open position. To accomplish these results, I connect or attach to the frame of the shutter a bracket C, and this bracket is constructed in a peculiar manner, best shown in Fig. 3. Heretofore, brackets have been used and attached to the shutter frame, but without reciting the objections to these brackets as usually made, it is sufficient to say that the main object of my present form of bracket is to provide a bracket which may be used with a comparatively short operating rod, and which can operate and hold the shutter in any desired position, and especially when the shutter is mounted on long hinges, throwing it outside of the line of the sill when open. In order to accomplish this and other objects, I form the brackets C, with a base piece C', having a lateral extension C², preferably projecting slightly downward, and in this way I am enabled to securely attach the bracket to the frame of the shutter, and I so arrange the screw-holes $c$ that no two of them come in line, thereby avoiding the danger of splitting the wood of the shutter. Mounted on the base piece, and preferably formed integral therewith, are two lips C³, C⁴, and these are arranged parallel to each other, preferably having a straight portion or side $c'$, and terminating in a rounded projecting end or offset $c^2$, and united by a pin C⁵, preferably cast integral therewith, and projecting outside of the straight side $c'$, so as to give a substantial bearing for the rod and permit it to occupy the positions hereinafter more particularly set forth. One of the objects of forming this bracket with the offset portions $c^2$, and the straight portions $c'$, is to permit the pivot pin C⁵ to be placed as near the line of the edge of the shutter or blind as possible when it is desired, and the straight edge permits the closing of the shutter without interference from the bead strip $a$, Fig. 2, the offset naturally falling in the space between the outer bead strip $a$, and the inner bead strip $a'$. Another advantage of the offset portion of the bracket is that it permits the use of a shorter operating rod. Connected to this bracket C, is the operating rod D, and this rod is provided at one end with a downwardly curved projection $d$, and the other end is bent or curved as at $d'$, and formed with an eye $d^2$, embracing the pin $C^5$. This rod is thus shaped or bent for several purposes, one being to permit the setting of the bracket farther from the outside edge of the shutter, so as to get a more substantial fastening. Moreover, when the shutter is closed, the bent rod is allowed to lie close to the face of the shutter, as shown in full lines in Fig. 2, where it is out of the way and less liable to interfere with the operation of the devices, and again, when the shutter is opened to the fullest extent, the bent rod permits this to be done without the rod coming in contact with the wood of the shutter, or requiring the wood to be cut away at the adjacent corner, and it will thus be seen that with this bent rod, I can apply the bracket to shutters of various thicknesses and sizes, with greater facility than in the other forms of brackets and rods.

Sometimes the rod D hangs down so that it interferes with the closing of the shutter, and it is necessary to lift its free end in order to permit the shutter to be closed, and in order to do this automatically, I provide what I term a rod lifter and holder E, and this may be variously constructed. As shown in Fig. 1, it is a separable article, secured to the face of the bottom of the shutter, having an inclined face $e$, and formed with an inclined notch or rest $e'$ to receive and hold the rod. A preferable construction, however, is to attach the rod lifter and holder to the bracket, and this may be done in any suitable way, or it may be formed integral therewith, as shown most clearly in Fig. 3, where the rod lifter is represented by the reference letter $E^2$, is formed integral with and extending from the lower lip $C^4$ of the bracket. It will be observed that this lifter E is so shaped that if the rod D is in a depressed position, so as to interfere with the free closing of the shutter, as soon as its free end impinges against the sill, or other portion of the window the inclined face $e$ of the lifter will impinge upon the under side of the rod raising it, so as not to interfere with the closing of the shutter, and holding it in the recessed portion $e'$.

In the patent above referred to, as in others of its class, the operating rod D has been used as a means for locking the shutter in its closed position, but it has been found that this is objectionable for some reasons, one being that it can be surreptitiously released from the outside, by means of a wire, or otherwise, and for this and other reasons, I have provided an independent locking device, and I attach this device F to the face of the shutter, a short distance from the free end of the rod D. While various devices may be used for the locking catch, I have shown a device which I have found effective and simple, and it consists essentially of a base portion $F'$, having an extended slotted tongue or projection $F^2$, the under side of which is inclined or beveled, as shown best in Fig. 6. Pivotally mounted in the base is a catch pin G, and this projects through the slot in the tongue $F^2$, and has a downward projecting latch $G'$, while its upper forward end is provided with an upwardly curved extension $G^2$, the forward end of this extension projecting over and resting on the end of the tongue $F^2$. One reason for so forming this locking catch, is to prevent its being manipulated by means of a wire or other device projecting through the slats of the shutter, as in the form shown it presents no faces or projections by which it may be operated or opened, in the manner indicated; while on the other hand, it forms a convenient means of opening the locking catch by the authorized operator from the inside, and furthermore, it operates to automatically lock the shutter when it is closed, in the manner hereinafter set forth.

Co-operating with the locking catch, is what I term the bowing and locking sill-plate H, shown in reverse perspective in Fig. 5. This plate is provided with an inclined projection $H'$, and an opening $H^2$ at the top of the projection, into which the locking latch $G'$ engages, and on either side of this central inclined plane, are one or more openings $H^3$ for the bowing of the shutter. One advantage of forming this sill-plate in the manner described, is that it requires but a single inclined plane and can be used on either side of the sill, to hold either portion of the shutter, and the central locking hole $H^2$ also furnishes a means for bowing the shutter, so that with three holes, as shown in the drawings, the shutter may be bowed and held in three separate positions, and of course, by providing one or more holes on each side of the central hole $H^2$, more positions of the shutter can be provided for. Another advantage is that the openings $H^3$ furnish a means by which the sill-plate can be attached to the sill, the screws passing through these openings, and resting on the beveled botton faces $H^4$, as best seen in Fig. 6, and in order to prevent water or other material from getting into these holes and obstructing the free entry of the operating rod, I cut the bottom or inside portion away, as clearly seen in Fig. 5, leaving openings $h$ above the screws, or other fastening devices, by which the plate is secured in position. As best seen in Fig. 7, the ends of the sill-plate having the openings $H^3$ are preferably raised slightly above the plane of the intermediate portion in which is the central locking opening, and this I do for two reasons, one being that the upwardly projecting edges form a guide in correctly setting the sill-plate and fixing it in position, so that the locking catch will properly engage therewith, and another is to make the holes $H^3$ of sufficient depth, their bottom portions being occupied by the fastening screws. In this construction it will be seen that with this form of sill-plate, I not only save material, but provide for a locking device, a bowing device with three or more openings, and a single form of sill-plate can be used for either or both of the shutters. When the sill-plate is in the position shown in Fig. 6, the inclined face H' thereof, performs another function, and that is, in connection with the tongue F² it tends to raise the shutter if perchance, it has become depressed or sags at its free edge, and it will be seen that the inclined under portion of the tongue F² will ride up the inclined plate H', and the tongue G', of the catch will also ride up the incline H' until the shutter is closed, when the catch will fall into position, and securely hold the shutter in place, and for the reasons before given, it will be perfectly burglar-proof.

It will thus be seen that I provide a locking sill-plate and a bowing sill-plate in one, saving material, and thus expense, and at the same time providing a neat and effective device.

In order to lock the shutter in its open position, I provide the usual small sill-plate I, into which the downward projecting end of the operating rod may be placed, to hold the shutter open, as shown in dotted lines Fig. 2.

While I have thus illustrated and described the preferred embodiment of my invention, as above indicated, some features of it may be used in connection with other devices. Thus, for instance, the rod lifter and holder may be used in connection with a bracket and slotted locking bracket, as shown in the patent above referred to, and it will be seen that it will readily operate to lift the locking rod, so that it will automatically enter the slot in the locking bracket, and drop into the locking sill-plate of that patent.

Other uses and combinations of parts might be suggested, but it is sufficient for the purposes of this case to point out the above. Further, it will be seen that with my improved device, when for instance, the operating rod D is used as a handle or lever for closing the shutter, the locking latch will automatically assume its position, and lock the shutter in place, whether the operating rod is arranged parallel with the face of the shutter, as shown in Fig. 2, or not.

What I claim is—

1. In a shutter-bower, the combination with a bracket and operating rod connected thereto, of a rod lifter and holder secured to the bracket and forming part thereof and having an inclined edge and shoulder, substantially as described.

2. In a shutter bower the sill plate having three openings in line with each other, and an inclined face extending downward and outwardly from the central opening, substantially as described.

3. In a shutter bower, a sill plate having a recessed under portion, a central opening, an inclined face extending downward and outwardly from said central opening, and openings to each side of said central opening which communicate with or lead to the recessed under portion, substantially as shown and for the purposes set forth.

4. In a shutter-bower, the combination with the sill-plate having a central opening and openings at each side thereof, the said openings projecting above the plane of the central opening and a locking bar for engaging the side openings, of a locking catch having a projecting tongue, and a pivoted locking latch, substantially as described.

5. In a shutter-bower, the combination with a bracket and an operating rod connected thereto, of a bowing and locking sill-plate provided with a central opening, an inclined face opposite said opening, and openings on each side of the central opening, and a locking catch provided with a tongue and locking latch, substantially as described.

In testimony whereof I have signed my name to this specification in the presence of two subscribing witnesses.

HARRY ZIMMERMAN.

Witnesses:
GEO. T. BAUMGARDNER,
LESLIE CRAMER.